United States Patent
Ishizuka

[11] Patent Number: 5,945,752
[45] Date of Patent: Aug. 31, 1999

[54] SHAFT-FIXED-TYPE MOTOR

[75] Inventor: Yutaka Ishizuka, Komagane, Japan

[73] Assignee: Sankyo Seiki Mfg. Co., Ltd., Nagano-ken, Japan

[21] Appl. No.: 08/998,269

[22] Filed: Dec. 24, 1997

[30] Foreign Application Priority Data

Dec. 27, 1996 [JP] Japan ................................. 8-349914

[51] Int. Cl.⁶ ............................. H02K 5/16; G11B 17/00
[52] U.S. Cl. .......................... 310/67 R; 310/91; 310/42; 310/43
[58] Field of Search ..................... 310/67 R, 91, 310/42, 43, 90; 411/907, 501; 29/596

[56] References Cited

U.S. PATENT DOCUMENTS

| | | | |
|---|---|---|---|
| 4,177,545 | 12/1979 | Lambertz | 411/501 |
| 5,097,164 | 3/1992 | Nakasugi et al. | 310/88 |
| 5,555,211 | 9/1996 | Bernett | 360/99.08 |

*Primary Examiner*—Nestor Ramirez
*Assistant Examiner*—Burt Mullis
*Attorney, Agent, or Firm*—McAulay Nissen Goldberg Kiel & Hand, LLP

[57] ABSTRACT

A shaft-fixed-type motor comprises a motor frame having a frame through hole formed therein, a fixed shaft having a shaft through hole at a center and fixed to the motor frame and a rotary member having a shaft hole into which the fixed shaft is inserted, and rotatably supported with respect to the fixed shaft. The motor also includes a hydrodynamic bearing mechanism arranged between an outer surface of the fixed shaft and an inner surface of the shaft hole, a rotor assembly integrally configured with the rotary member, a stator assembly installed to the motor frame and positioned opposite the rotor assembly and a joining member having a head portion and a shaft portion. The joining member is for fixing the fixed shaft to the motor frame by inserting the shaft portion into the shaft through hole of the fixed shaft and the frame through hole of the motor frame and plastically deforming an opposite end from the head portion.

11 Claims, 2 Drawing Sheets

SHAFT-FIXED-TYPE MOTOR

BACKGROUND OF THE INVENTION a) Field of the Invention

The present invention relates to a shaft-fixed-type motor used in rotary polygon mirror type optical scanning devices and the like. More specifically, it relates to an improvement of a structure of fixing a fixed shaft to a motor frame.

b) Description of the Related Art

A shaft-fixed-type motor used in rotary polygon mirror type optical scanning devices and the like is disclosed in, for example, JP No. H6-17687. In the shaft-fixed-type motor, the fixed shaft is fixed to a motor frame such that a shaft edge thereof is shrinkage-fitted or press-fitted to a hole formed in the motor frame. A rotary member is rotatably supported around an outer circle of the fixed shaft. Around the outer surface of the rotary member, a rotor assembly is integrally installed. Further, a stator assembly is arranged facing the rotor assembly. Also between the fixed shaft and rotary member, a hydrodynamic bearing mechanism is provided by cutting hydrodynamic pressure generating grooves on the outer surface of the fixed shaft. Upon driving the motor, the rotary polygon mirror attached to the rotary member turns together with the motor, and then an incident laser beam is reflected at the rotary polygon mirror and polarized in a predetermined direction.

In addition, U.S. Pat. No. 5,555,211 has disclosed a magnetic disk driving motor in which a fixed shaft is fixed to a motor frame using screws.

When fixing the fixed shaft to the motor frame in the above mentioned manner, however, there are the following problems to be solved.

It is desirable to fix the fixed shaft with a certain angle with respect to the motor frame, that is, with a right angle. However, when using a shrinkage-fitting or press-fitting fixing method, it is highly possible in practice that the shaft be slightly inclined with respect to the perpendicular direction. For example, a stress generated when the fixed shaft is pushed in the motor frame is applied onto the fixed shaft and motor frame, and consequently a deformation occurs on the whole or the fixed shaft inclines. The inclined fixed shaft will be a cause of surface vibrations on the rotary polygon mirror attached to the rotary member during the rotation. As a result, scanning cannot be performed in a direction targeting the laser beam reflected at the vibrated mirror surface.

In addition, these fixing methods require more strict control of the dimensions of the shaft end of the fixed shaft and the hole in the motor frame. If the hole diameter is too large, for example, the fastening strength of the fixed shaft is decreased. Consequently the fixed shaft may come off the motor frame during the driving.

Furthermore, if the shrinkage-fitting or press-fitting of the fixed shaft to the motor frame is carried out in an improper manner and therefore the product needs to be removed as defective, it is not economical because the expensive fixed shaft needs to be abandoned together with the motor frame.

Also, in a method of fixing the fixed shaft on the motor frame with a screw, a screw hole needs to be formed in the fixed shaft, requiring machining, and then producing the machining waste when forming the screw hole. If the machining waste is not removed completely, the remnant may invade the bearing, causing noise and poor rotations during the motor operation.

OBJECT AND SUMMARY OF THE INVENTION

A primary object of the present invention, then, is to provide a shaft-fixed-type motor having a structure with which such conventional problems can be overcome, and by which the fixed shaft can be firmly and highly accurately fixed to the motor frame.

A further object of the present invention is to provide a shaft-fixed-type motor capable of preventing noise and poor rotations which are normally caused by the machining waste.

In accordance with the invention, a shaft-fixed-type motor comprises a motor frame having a frame through hole formed therein, a fixed shaft having a shaft through hole at a center and fixed to the motor frame and a rotary member having a shaft hole into which the fixed shaft is inserted, and rotatably supported with respect to the fixed shaft. The motor also includes a hydrodynamic bearing mechanism arranged between an outer surface of the fixed shaft and an inner surface of the shaft hole, a rotor assembly integrally configured with the rotary member, a stator assembly installed to the motor frame and positioned opposite the rotor assembly and a joining member having a head portion and a shaft portion. The joining member is for fixing the fixed shaft to the motor frame by inserting the shaft portion into the shaft through hole of the fixed shaft and the frame through hole of the motor frame and plastically deforming an opposite end from the head portion.

DESCRIPTION OF THE PREFERRED EMBODIMENTS

Figure 1:
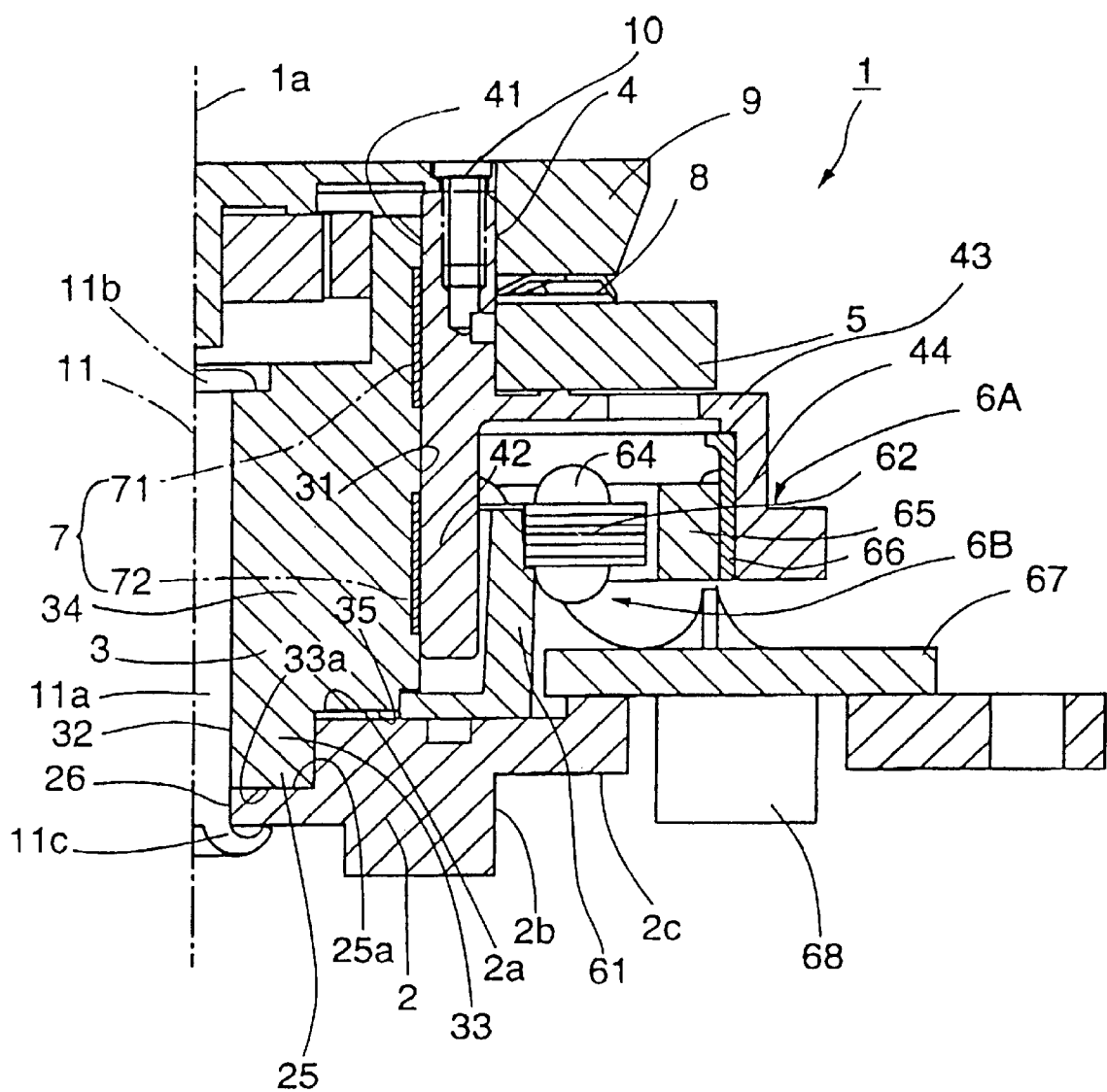
FIG. 1 is a half cross-sectional view of a rotary polygon mirror type optical scanning device having a shaft-fixed-type motor of the present invention.

An embodiment of a shaft-fixed-type motor of the present invention will be described referring to the drawings.

FIG. 1 illustrates a rotary polygon mirror type optical scanning device 1 having a shaft-fixed-type motor. The rotary polygon mirror type optical scanning device 1 comprises a motor frame 2, a fixed shaft 3 perpendicularly adhered to the motor frame 2, a rotary member 4 rotatably held against an outer circle of the fixed shaft 3, a rotary polygon mirror 5 mounted on the rotary member 4, a rotor assembly 6A integrally installed with the rotary member 4, and a stator assembly 6B installed on the motor frame 2.

A hydrodynamic bearing mechanism 7 is configured between an outer surface 31 of the fixed shaft 3 and a shaft hole 41 formed in the rotary member 4. In this embodiment, herringbone-shaped first and second hydrodynamic pressure generating grooves 71 and 72 are cut in the outer surface 31 of the fixed shaft 3 such that they are away from each other by a predetermined distance in the direction of the axis 1a. Between the outer surface 31 of the fixed shaft 3 and an inner surface of the shaft hole 41 of the rotary member 4, a minute gap of about 5–10 microns is formed, in which a fluid such as air is interposed. By employing the hydrodynamic bearing mechanism 7 in which air is interposed, the rotary polygon mirror 5 can be turned at super high speed, such as several ten thousand turns a minute, in a stable manner.

The rotary member 4 has a cylindrical portion 42 including the shaft hole 41 inside thereof, a mirror mounting portion 43 projecting annularly outward in the radius direction from the axially center position in the outer surface of the cylindrical portion 42, and a cylindrical flange portion 44 bent perpendicularly from the outer periphery of the mirror mounting portion 43 and extended in the axis, 1a, direction.

The front surface of the mirror mounting portion 43 is for attaching a mirror, and the rotary polygon mirror 5 is mounted thereto. The rotary polygon mirror 5 is pressed toward the mirror mounting portion 43 by a clamp member 9 via a pressing spring 8. The clamp member 9 is fixed at the upper end of the cylindrical portion 42 of the rotor 4 by fastening a joining bolt 10.

A stator assembly 6B is arranged outside the outer surface of the cylindrical portion 42 of the rotor 4 and below the mirror mounting portion 43, such that it coaxially surrounds the outer circle of the cylindrical portion 42. The stator assembly 6B includes a core holder 61. The bottom edge of the core holder 61 is fixed to the motor frame 2. A stator core 62 is coaxially mounted around the outer circle portion at the upper end of the core holder 61. The stator core 62 has a plurality of salient-poles around the circumference at constant intervals. A stator coil 64 is wound around the salient-poles.

The rotor assembly 6A has a drive magnet 65 and a magnet yoke 66. The drive magnet 65 is coaxially arranged around the outer circle of the stator core 62. The magnet yoke 66 is adhered between the drive magnet 65 and the inner surface of the flange 44 formed in the rotary member 4. In this embodiment, the stator core 62 and the drive magnet 65 are coaxially arranged in this manner, that is, the motor employs a structure in that a magnetic flux is formed in a radius direction.

A motor circuit board 67 is placed on the motor frame 2 below the stator core 62 and drive magnet 65. On the front and back surfaces of the motor circuit board 67, electric components such as a connector 68, etc. are mounted.

In the shaft-fixed-type motor of the present invention, the fixed shaft 3 is fixed to the motor frame 2 in the following configured state. In other words, the fixed shaft 3 has a main body portion 34, a protrusion portion 33 formed on an end of the main body portion 34 on the motor frame 2 side, and a shaft through hole 32 formed at the center of the protrusion portion 33 in the direction of the axis 1a. The protrusion portion 33 is coaxial with the shaft through hole 32, formed having smaller diameter than that of the main body portion 34, and projected in the direction of the axis 1a. There are no protrusions and recesses, such as screw threads, on the inner surface of the shaft through hole 32, and the inner edge thereof when cut vertically is almost flat. Its inner diameter is almost constant.

On the other hand, a circular recess portion 25 having a predetermined depth capable of accommodating the protrusion portion 33 is formed in the motor frame 2. At the center of the recess portion 25, a straight, frame through hole 26 having almost constant inner diameter is formed in the same manner as the shaft through hole 32. The depth of the recess portion 25 is set to be slightly shorter than the projecting amount of the protrusion portion 33.

Into the shaft through hole 32 and frame through hole 26, a joining member which is plastically deformed for fixing, a rivet 11, for example, is inserted. The rivet 11 has a shaft portion 11a and a head portion 11b of a larger diameter. The head portion 11b is in a state of contacting an open end surface of the shaft through hole 32. The shaft portion 11a is long enough to pass through the shaft through hole 32 and frame through hole 26 and projects out of the back surface of the motor frame 2. The shaft end 11c projecting from the back surface of the motor frame 2 is plastically deformed by caulking to firmly fix the fixed shaft 3 to the motor frame 2. In other words, the fixed shaft 3 is fixed to the motor frame 2 such that the head portion 11b and shaft end 11c of the rivet 11 axially sandwich the fixed shaft 3 and motor frame 2.

Also, when the shaft end 11c is plastically deformed to fix the fixed shaft 3 with the motor frame 2, almost all the stress is applied only to the rivet 11, and therefore, the fixed shaft 3 and motor frame 2 are not extremely deformed.

Note that when necessary to remove the fixed shaft 3 and motor frame 2, it is possible to easily disassemble by cutting the plastically deformed portion or restoring to the original state.

The protrusion portion 33 formed at the fixed shaft 3 is fitted into the recess portion 25 formed at the motor frame 2 such that the edge surface 33a contacts the bottom surface 25a and also the outer side surface of the protrusion portion 33 contacts the inner side surface of the recess portion 33.

The edge surface 33a of the protrusion portion 33 and the bottom surface 25a of the recess portion 25 are fiducial surfaces for positioning so that the fixed shaft 3 is determined its axial position and mounting angle with respect to the motor frame 2.

In addition, it is possible to machine the edge surface 33a simultaneously with the outer surface 31 in which the first and second hydrodynamic pressure generating grooves 71 and 72 are cut; with the simultaneous machining, the perpendicularity of the outer surface 31 with respect to the edge surface 33a can be obtained with high precision. Therefore, by making the edge surface 33a of the protrusion portion 33 contact with the bottom surface 25a on the motor frame 2 side, the fixed shaft 3 can be set perpendicular to the motor frame 2.

Note that, as illustrated in FIG. 1, the edge surface 35 surrounding the protrusion portion 33 of the fixed shaft 3 does not make contact with a motor frame front surface 2a, that is, a slight gap is provided therebetween. Because of the gap, the edge surface 33a of the protrusion portion 33 can be made to contact with the bottom surface 25a of the recess portion 25 firmly.

The motor frame 2 is secured to a main frame (not illustrated) of an optical apparatus, such as a laser printer, to which the rotary polygon mirror type optical scanning device 1 is installed. As a fiducial surface for this fixing, in FIG. 1, the outer surface 2b and edge surface 2c of the motor frame back surface 2b can be used. These surfaces 2b and 2c can be simultaneously machined with the bottom surface 25a which is in contact with the edge surface 33a, the fiducial surface on the fixed shaft 3. Therefore, machining those surfaces simultaneously can obtain the highly precise perpendicularlity between the bottom surface 25a and the outer surface 2b; also the mounting angle of the fixed shaft 3 with respect to the main frame can be set to be a highly precise, desirable angle. As a result, an excellent optical scanning can be obtained without inclining the mirror surface of the rotary polygon mirror 5.

In the above mentioned shaft-fixed-type motor of the present invention, as an ambient temperature changes, each member may be thermally deformed to, for example, change the fastening condition between the fixed shaft 3 and motor frame 2. Then, to prevent the changes due to thermal deformations, it is desirable to form the rivet 11, fixed shaft 3, and motor frame 2 of materials having substantially the same linear thermal expansion coefficient. The material having substantially the same linear thermal expansion coefficient means that each material has the linear thermal expansion coefficient within the range in which the excellent joining condition between the fixed shaft 3 and motor frame 2 is not affected by the thermal deformations caused by supposed changes in temperature. Taking account machining and the like, it is ideal that these three members are formed of the same material such as aluminum, etc.

In the rotary polygon mirror type optical scanning device 1, the rotary member 4 is rotatably supported with respect to the fixed shaft 3 via the hydrodynamic bearing mechanism 7. To maintain the excellent bearing performance of the hydrodynamic bearing mechanism, it is necessary to set the constant gap at the hydrodynamic pressure generating groove cutting areas between the fixed shaft 3 and rotary member 4. If the outer surface 31 of the fixed shaft 3 is deformed by a caulking operation of the rivet 11, the bearing performance will be degraded. In order to avoid such a problem, it is necessary to increase the strength of the fixed shaft 3. Then, if the outer diameter of the fixed shaft 3 is set at least three times as large as the inner diameter of the shaft through hole 32 formed at the center of the fixed shaft, the deformation of the outer diameter of the fixed shaft 3, which is normally caused by the caulking of the rivet 11, can be prevented.

Further, the shaft through hole 32 and frame through hole 26 respectively formed at the fixed shaft 3 and motor frame 2 are straight through holes, and therefore, there is no screw threads which will be a cause of generating machining wastes. Consequently the machining wastes do not invade inside the hydrodynamic bearing mechanism 7, thus preventing noise and poor rotations.

Figure 2:
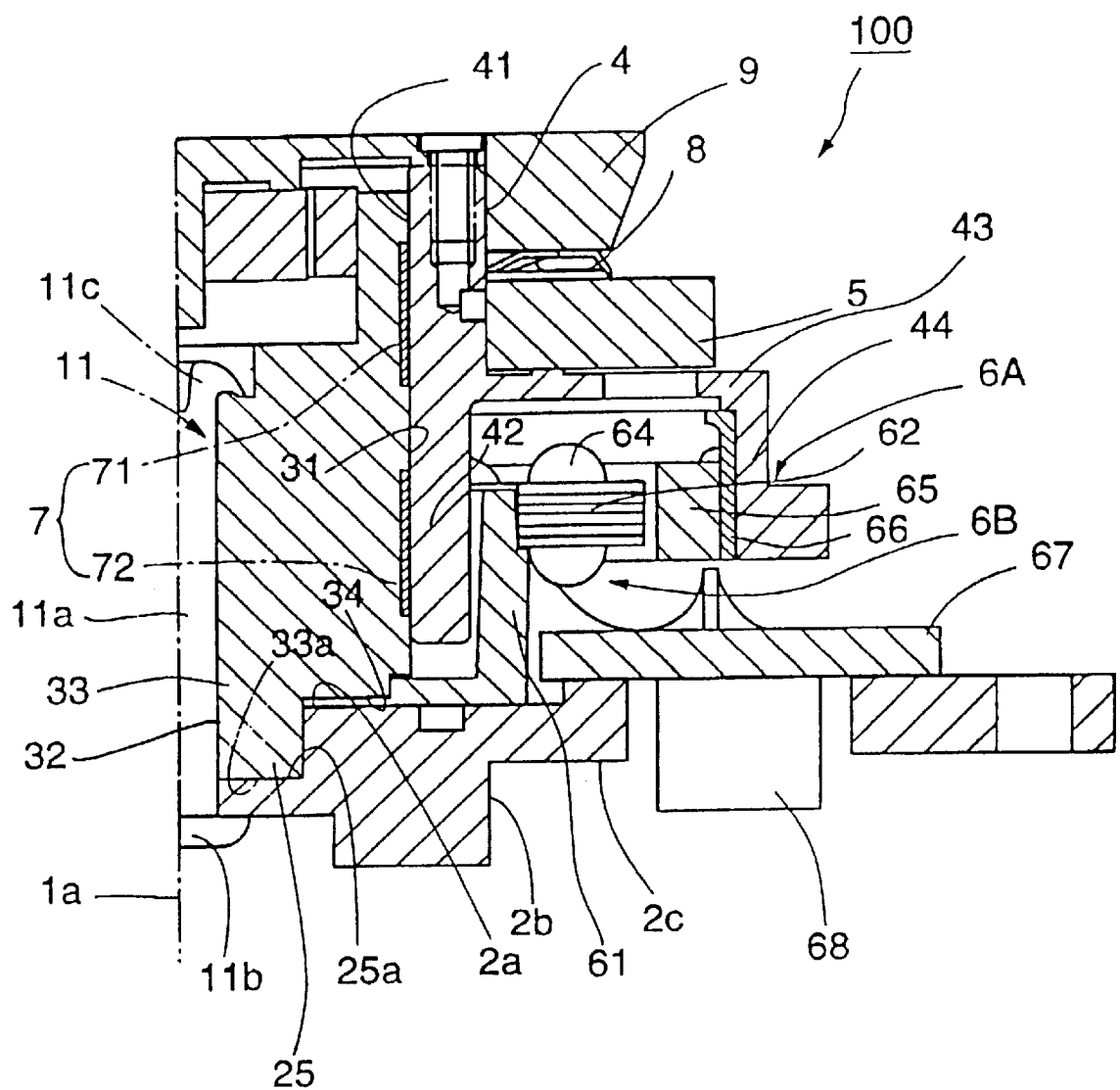
FIG. 2 is a half cross-sectional view of another embodiment of the rotary polygon mirror type optical scanning device of FIG. 1.

FIG. 2 illustrates another embodiment of the shaft-fixed-type motor of the present invention. A difference between the rotary polygon mirror type optical scanning device 100 having the shaft-fixed-type motor illustrated in FIG. 2 and one illustrated in FIG. 1 is that the rivet 11, a joining member to be plastically deformed for fixing, is installed up side down. Other configurations remain the same as the shaft-fixed-type motor illustrated in FIG. 1. Accordingly, each member in FIG. 2 corresponding to each portion in FIG. I is coded the same, and its description is omitted.

Even when installing the rivet 11 up side down in this manner, the same effect can be obtained as the above described embodiment.

Note that the shaft-fixed-type motor of the present invention can be applied to, for example, driving devices such as optical disks and magnetic disks as well as used as a driving source for the above mentioned rotary polygon mirror.

As described above, in the shaft-fixed-type motor of the present invention, the joining member used for fixing members through a plastic deformation is inserted into shaft through hole and frame through hole, and the joining member is plastically deformed by caulking and the like, to fix the fixed shaft to the motor frame. Therefore, compared to fixing the fixed shaft by a conventional shrinkage-fitting or press-fitting, the operation is easy and the fixed shaft can be firmly fixed to the motor frame.

If the fixing is not strong enough, only the joining member may be replaced, thus being economical.

Also, in the present invention, the protrusion portion formed at the fixed shaft can be simultaneously machined with the fixed shaft outer surface; therefore, by fitting the protrusion portion into the recess portion formed at the motor frame, the axial position and mounting angle of the fixed shaft with respect to the motor frame can be determined, thus making it possible to mount the fixed shaft to the motor frame in a highly precise manner, compared to the conventional technology.

In addition, in the present invention, the fixed shaft, motor frame, and joining member are formed of materials having substantially the same linear thermal expansion coefficient. This fact prevents the fixing condition of the fixed shaft from being degraded due to thermal deformations.

Further, in the present invention, besides the hydrodynamic bearing mechanism being employed, the outer diameter of the fixed shaft is set at least three times as large as the inner diameter of the through hole formed at the center of the fixed shaft; therefore, the problem, in that, when fixing the fixed shaft to the motor frame, the fixed shaft outer surface is deformed and the bearing performance is degraded, can be prevented.

While the foregoing description and drawings represent the preferred embodiments of the present invention, it will be obvious to those skilled in the art that various changes and modifications may be made therein without departing from the true spirit and scope of the present invention.

What is claimed is:

1. A shaft-fixed-type motor comprising:

a motor frame having a frame through hole formed herein;

a fixed shaft having a shaft through a motor frame having a frame through hole formed therein;

a fixed shaft having a shaft through hole at a center and fixed to said motor frame;

a rotary member having a shaft hole, into which said fixed shaft is inserted, and rotatably supported with respect to said fixed shaft;

a hydrodynamic bearing mechanism arranged between an outer surface of said fixed shaft and an inner surface of said shaft hole;

a rotor assembly integrally configured with said rotary member;

a stator assembly installed to said motor frame and positioned opposite said rotor assembly; and a joining member having a head portion and a shaft portion, said joining member for fixing said fixed shaft to said motor frame by inserting said shaft portion into said shaft through hole of said fixed shaft and said frame through hole of said motor frame and plastically deforming an opposite end from said head portions;

wherein said fixed shaft has a main body portion and a protrusion portion, said protrusion portion having a smaller diameter than that of said main body portion and being formed at one end of said main body; said motor frame having a recess portion capable of accommodating said protrusion portion; a mounting position of said fixed shaft on said motor frame being defined by the contact between an edge surface of said protrusion portion and a bottom surface of said recess portion; and the depth of the recess portion being set to be shorter than the projection amount of the protrusion portion.

2. The shaft-fixed-type motor as set forth in claim 1 wherein said edge surface of said protrusion portion and said bottom surface of said recess portion act as fiducial surfaces for fixing said fixed shaft to said motor frame; said edge surface of said protrusion portion being formed in a direction orthogonal to an outer surface of said fixed shaft.

3. The shaft-fixed-type motor as set forth in claim 2 wherein said rotary member has a mirror mounting portion for loading a rotary polygon mirror.

4. The shaft-fixed-type motor as set forth in claim 1 wherein said shaft through hole of said fixed shaft and said frame through hole of said frame are almost constant in inner diameters thereof.

5. The shaft-fixed-type motor as set forth in claim 4 wherein said rotary member has a mirror loading portion for a rotary polygon mirror.

6. The shaft-fixed-type motor as set forth in claim 1 wherein said fixed shaft, motor frame, and joining member are formed of materials having substantially the same linear thermal expansion coefficient.

7. The shaft-fixed-type motor as set forth in claim 1 wherein said rotary member has a mirror mounting portion for loading a rotary polygon mirror.

8. The shaft-fixed-type motor as set forth in claim 1 wherein said fixed shaft is joined and fixed with said motor frame plastically deformed by caulking, and the like, an opposite end of said head portion of said joining member.

9. The shaft-fixed-type motor as set forth in claim 1 wherein an outer diameter of said fixed shaft is at least three times as large as an inner diameter of said shaft through hole formed in said fixed shaft.

10. The shaft-fixed-type motor as set forth in claim 1 wherein a surface of said motor frame, which is formed on the opposite surface against which is fixed said shaft, can be simultaneously machined with said bottom surface which is in contact with said edge surface of said fixed shaft.

11. The shaft-fixed-type motor as set forth in claim 1 wherein said joining member is a rivet.

\* \* \* \* \*